Oct. 15, 1935.  V. A. BARY  2,017,615
PACKING FOR ROTARY SHAFTS
Filed April 20, 1933   5 Sheets-Sheet 1
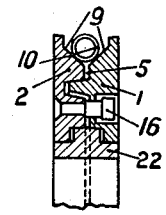
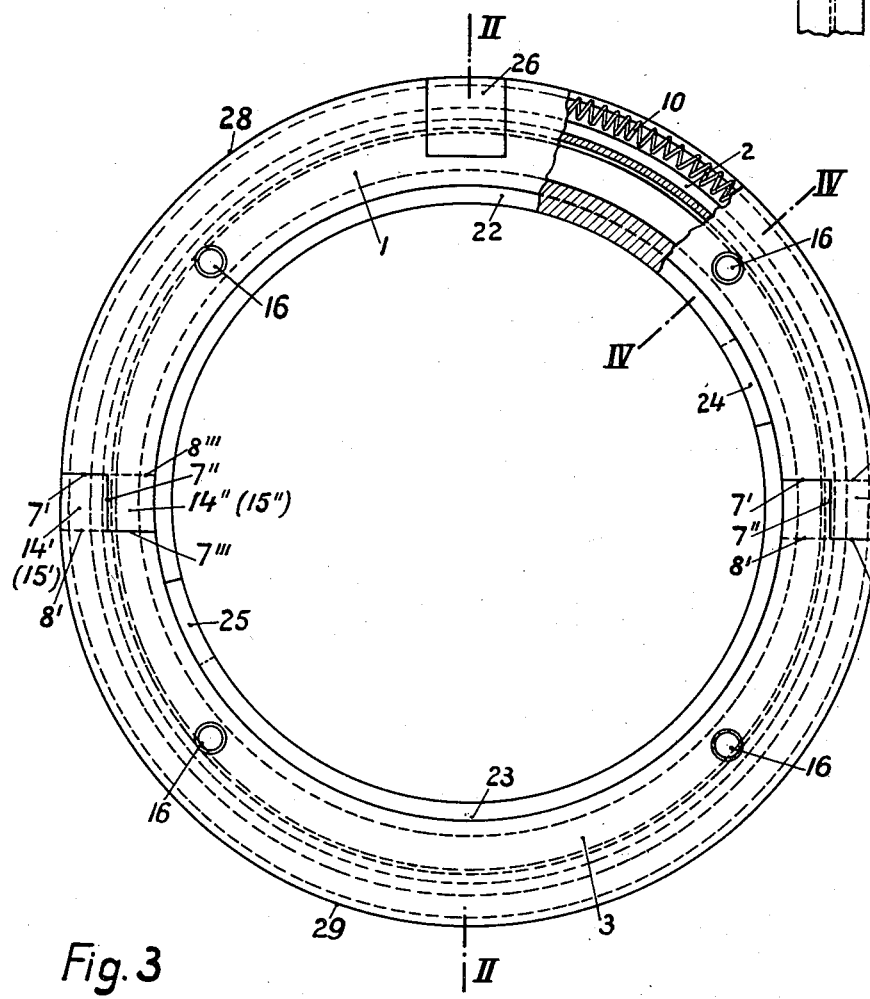
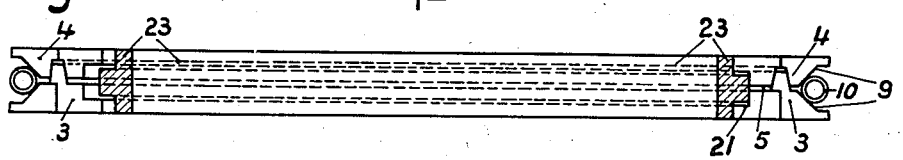
Inventor:
Victor Alexander Bary Oct. 15, 1935. V. A. BARY 2,017,615
PACKING FOR ROTARY SHAFTS
Filed April 20, 1933 5 Sheets-Sheet 2
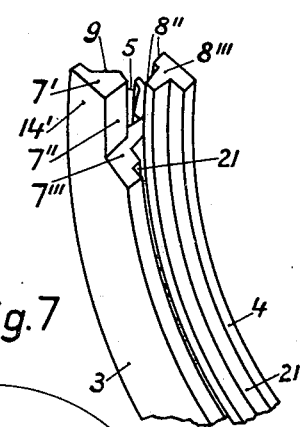
Fig. 7
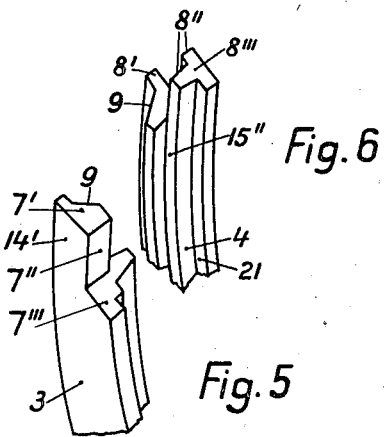
Fig. 6
Fig. 5
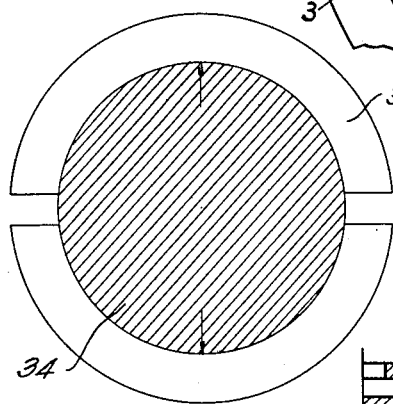
Fig. 9
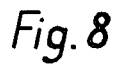
Fig. 8
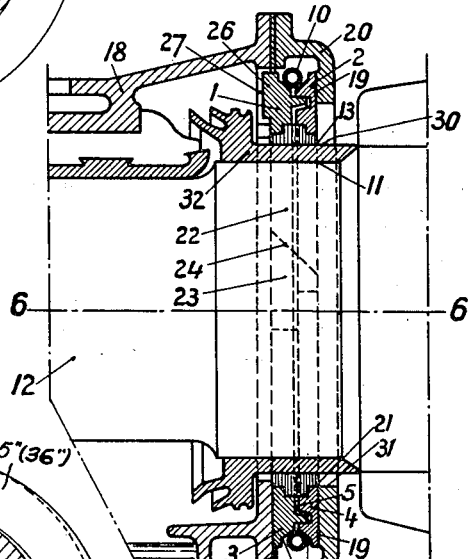
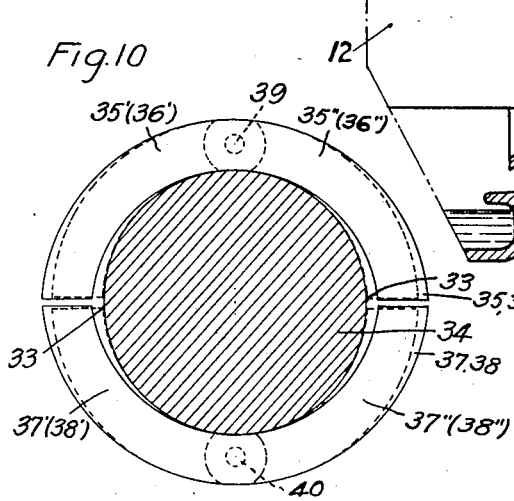
Fig. 10
Inventor:

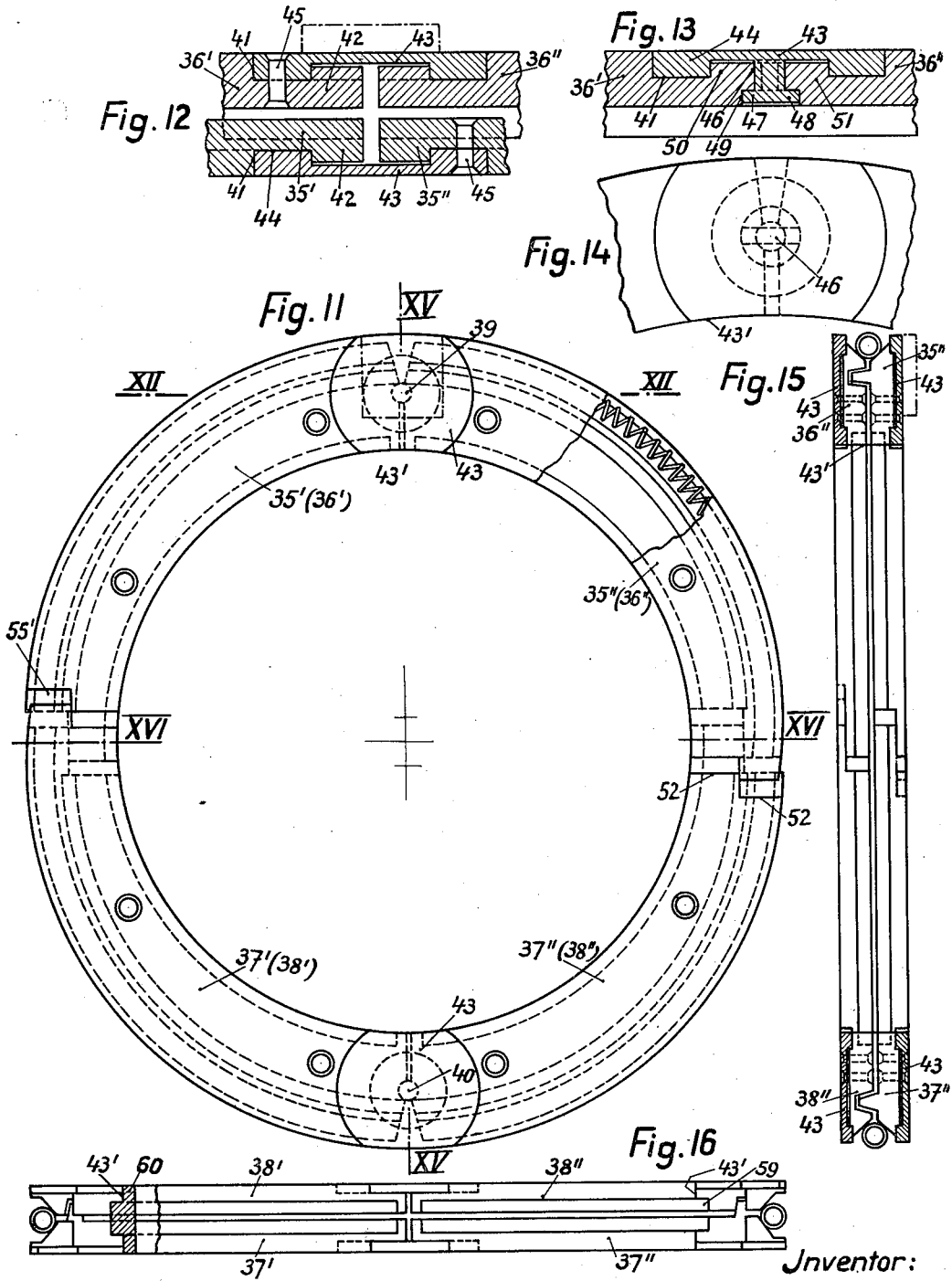

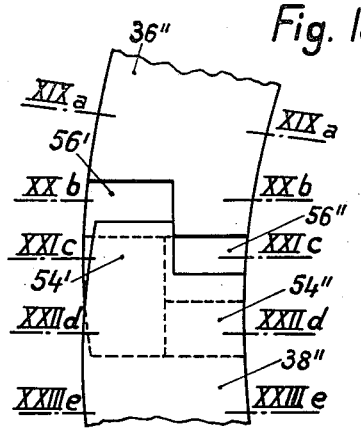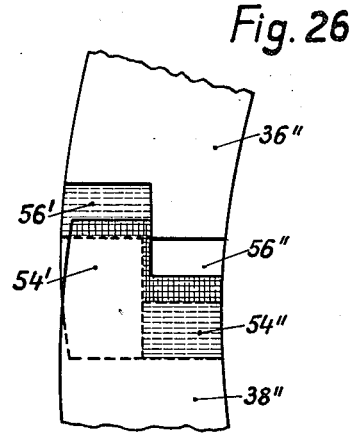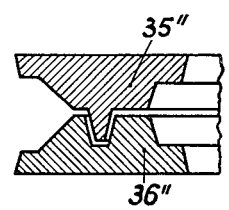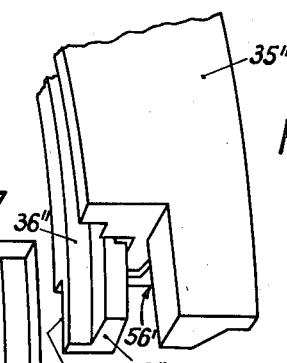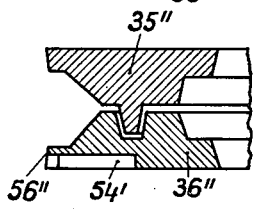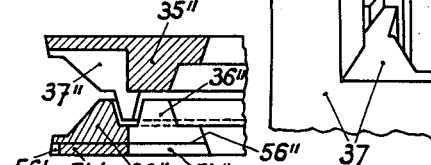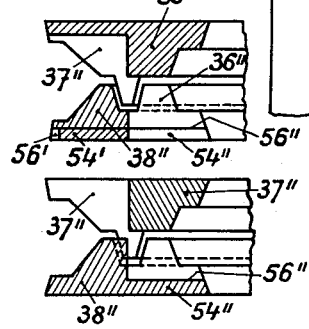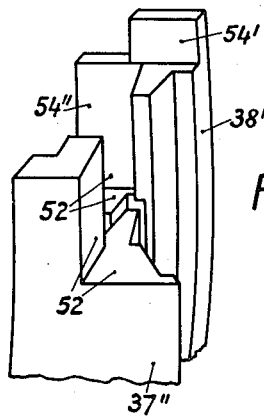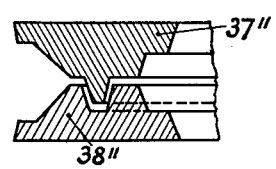

Oct. 15, 1935.  V. A. BARY  2,017,615

PACKING FOR ROTARY SHAFTS

Filed April 20, 1933   5 Sheets—Sheet 5

Inventor:
Victor Alexander Bary

Patented Oct. 15, 1935

2,017,615

UNITED STATES PATENT OFFICE

2,017,615

PACKING FOR ROTARY SHAFTS

Victor Alexander Bary, London, England

Application April 20, 1933, Serial No. 667,004
In Germany April 21, 1932

24 Claims. (Cl. 286—22)

This invention relates to the packing of a rotary shaft against the housing arranged upon it, more particularly to an oil and dust packing for axle bearings of rail vehicles. In connection with such packings, the problem arises to so design the packing that it fully complies with the requirements notwithstanding the continuous movements of the shaft against the housing which occur in axle bearings in the form of impact movements of the shaft. The problem is rendered difficult in that the shaft undergoes changes even in the diameter owing to wear and tear as well as subsequent machining and that the interchangeable structure renders it necessary to use the same packing at one time for a shaft of less diameter and at another time for a shaft or larger diameter. In order to solve the aforesaid problem, the present invention proceeds from the fact that a sealing packing of the rotary shaft can only be obtained by flexible packing material such as leather, felt, fiber, rubber, Babbitt metal or the like. However, these materials do not possess rigidity and especially when owing to the absorption of oil they become soft and spongy so far as they are of a microporous nature. Consequently, these flexible materials used for packing the rotary shaft must be encased by rigid and preferably metallic members after the manner of a casing. However, these rigid members of the packing have to serve a double purpose. They have to press the flexible materials firmly against the rotary shaft and encase them after the manner of a casing so that the packing pressure over the flexible materials is also effective on the shaft to be packed and notwithstanding the impact-like movement of the shaft, the said rigid members must bear tightly against the housing. Owing to the impact-like movements of the shaft against the housing flexible packing means cannot come into consideration because they would soon wear away under the influence of the packing pressure and the absorption of oil. The rigid members must therefore be brought into direct contact with the walls of the housing. In order to fulfil the two fold object, notwithstanding the rigid construction of the members encasing the flexible packing means, the rigid packing members must be divided according to the planes containing the axis of the shaft and disposed perpendicularly thereto. Consequently, a packing designed according to the invention is characterized by a rigid packing device which is arranged between shaft and housing in a packing chamber thereof and comprises several rigid members, which are separated by dividing planes perpendicular to the axis and by dividing planes containing the axis, means being provided for spreading apart the rigid members in an axial direction and drawing them toward one another in a radial direction. The said packing device is situated with its end surface directly against the walls of the packing chamber and has an annular recess in the inner surface of the metallic members turned toward the shaft, in which recess flexible packing means are arranged and encased by the metallic packing members after the manner of a casing. These flexible packing means bear directly against the shaft to be packed, the spacing between the metallic members and the shaft being greater than the possible change in thickness of the flexible means due to wear and tear as well as compression.

The invention also consists in adapting the rigid packing members to the circular shape of the shaft by providing joints and designing the dividing joints in such a manner that an axial passage for oil out of the axle bearing and for foreign bodies into the axle bearing is impossible.

The drawings show by way of example a construction of a device for carrying out the packing process proposed according to the invention.

Fig. 1 is a plan of the packing as seen from the interior of the axle bearing housing.

Fig. 2 represents a vertical longitudinal section on the line II—II of Fig. 1 through the packing, the stepped insertion of yielding materials being imagined removed from the middle part, in order to show the recess for the reception of the material in the form of strips.

Fig. 3 is a plan of the lower part of the packing after the removal of the upper part of the packing.

Fig. 4 is a cross-section through the packing on the line IV—IV of Fig. 1.

Figs. 5 and 6 show in perspective the constructions of the steps in the lower half of the packing the packing being taken to pieces.

Fig. 7 shows the same part of the packing also in perspective in its assembled condition.

Fig. 8 finally represents in vertical longitudinal section through a part of the axle bearing housing the packing built into the dust pocket.

Fig. 9 is a front elevation of the dust packing, when in a condition completely drawn apart, that is, when the shaft to be packed, particularly the clearance race of the axle journal to be packed, possesses the maximum diameter occurring in the running of this dust packing.

Fig. 10 shows the same dust packing in the case of the smallest shaft diameter coming in practice into consideration.

Fig. 11 is an end elevation of a packing member constructed according to the invention, while Fig. 12 represents a horizontal section on the line XII—XII through the packing member according to Fig. 11.

Fig. 13 shows a modified form of the joint on a section the same as that adopted in Fig. 12.

Fig. 14 is the corresponding end elevation of the joint.

Fig. 15 is a vertical section through the packing member according to Fig. 11 on line XV—XV of the same, while Fig. 16 is a horizontal section through the packing member according to Fig. 11 on the line XVI—XVI of the same.

Fig. 17 shows the already proposed construction of the separation joint on the packing member according to Fig. 7, but for the purpose of rendering the specification clearer is drawn once more by the side of the following figures, while Fig. 18 represents with the section Figures 19 to 23 the construction of the separation joint according to the invention.

Fig. 24 shows in perspective from below the construction of the upper packing member part at the separation joint, while Fig. 25 represents in perspective from above the construction of the lower packing member part at the separation joint.

Fig. 26 illustrates the overlapping in the separation joint when the packing member parts are drawn apart.

Figure 27:
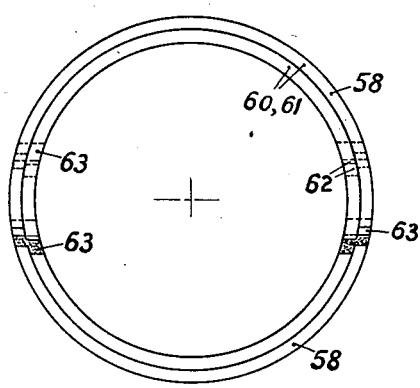
Figure 28:
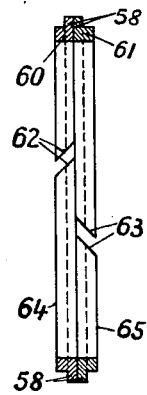

Figs. 27 and 28 show in end elevation and in vertical longitudinal section the construction of the elastic strip with longitudinal joint, the ring itself being constructed in two parts.

Figure 29:
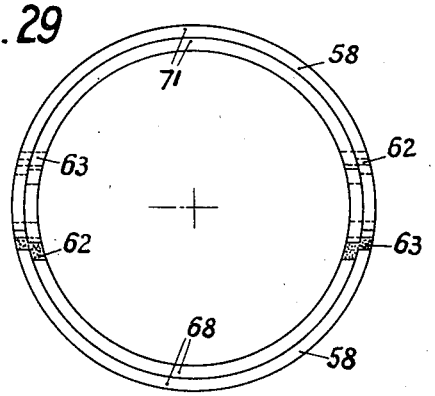
Figure 30:
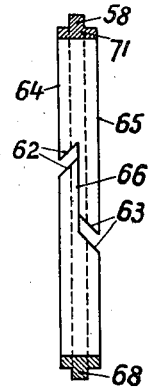

Figs. 29 and 30 show a modified strip construction in end elevation and in vertical longitudinal section, the strip being a one part strip.

Figure 31:
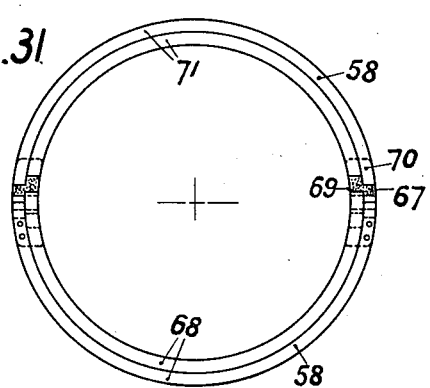
Figure 32:
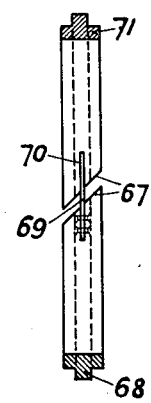

Figs. 31 and 32 show in end elevation and in vertical longitudinal section a modified strip with an inserted partition.

The annular packing consists of four parts 1, 2, 3 and 4. Between the parts 1 and 3 on the one hand or 2 and 4 on the other hand there is situated a dividing joint 5 which lies in a plane at right angles to the axle 6—6 (see Fig. 8). Additional dividing joints 7′, 7″, 7‴ between the parts 1 and 3 or 8‴, 8″ and 8′ between the parts 2 and 4, lie in radial planes. On account of the dividing joints 5 there exists a movability of the joint in itself in the axial direction and on account of the dividing joints 7′, 7″, 7‴, 8‴, 8″, 8′ in the radial direction. Now in furtherance of the principle of the invention each pair of packing members 1 and 2 or 3 and 4 possess each the half of a conical annular recess 9 for the reception of a stressed spiral spring 10 closed on itself. The internal stress of this spiral spring 10 acts in a two-fold manner. In the first place the parts 1 and 2 and also 3 and 4 are spaced apart so that they bear firmly against the walls 18 and 20 (see Fig. 8) of the packing housing; moreover the parts 1 and 2 on the one hand and the parts 3 and 4 and on the other hand are drawn towards each other in the radial direction, so that they tightly surround the shaft to be packed (see also Fig. 10). The dividing joints 7″, 8″ which are formed by the displacement of the steps (notches) 14′, forming them, in the part 3 relatively to 14″ in the part 1, and 15′ in the part 2 relatively to 15″ in the part 4, serve moreover not only to interrupt the course of the joint 7′—7‴ and 8‴—8′ but simultaneously serve as guiding means for the parts 1 and 2 on the one hand relatively to the parts 3 and 4 on the other hand. The dividing joints are moreover such that the parts 1 and 3 on the one hand and the parts 2 and 4 on the other hand are symmetrical among themselves so that these parts can be manufactured with a single Kokille or other mould. Distance bolts 16, which are riveted into the parts 2 and 4 for example, enable the packing members to be held together even in the unassembled condition of the packing. As Fig. 8 shows the parts 1 and 3 or 2 and 4 now abut against the end surface 17 of the axle bearing housing 18 or against the end surfaces 19 of the dust pocket cap 20 and produce in the axial direction a complete packing-closure. In order to improve the packing at the clearance race, the packing members 1 to 4 possess in addition to the conical recess 9 on their internal surface an additional annular recess 21 in which are inserted strips 22, 23 of yielding materials such as leather, felt, fibre or the like. As Figs. 2 and 8 show the dividing joints 24 and 25 run obliquely to the inclination to the interior of the axle bearing housing, in order to obtain a diminution of the foreign bodies, possibly penetrating in, on the first elements of the course in the dividing joint. Instead of the continuous incline the dividing joint may be interrupted step-wise as is shown in dotted lines. The part 1 of the packing possesses at 26 a thickening in the form of a parallelopipedon, with which it is guided in a recess 27. In this manner the packing parts 1, 2 and 3, 4 which are also of semicircular shape at their outer limiting surfaces 28, 29, are prevented from turning. As Fig. 1 shows the packing is moreover somewhat thickened in the vertical direction, in order to take account of the elliptic shape of the dust pocket opening 30. This elliptic shape is suitable, in order to raise the lower edge 31 of the dust pocket opening 30, nevertheless the dust pocket 20 must be produced beyond the spraying ring 32 with a comparatively large diameter. The parts 1, 2 and 3, 4 of the packing consist suitably of metal, preferably aluminium, in order to render possible particularly simple manufacture in the spraying or Kokillen casting. For this purpose all surfaces situated in the axial direction have a somewhat conical shape, in order to facilitate the withdrawal of the spraying or casting products from the ingot or spraying mould. Of course the parts 1, 2 and 3, 4 can equally well be stamped from sheet strip, be turned out from the solid or manufactured in some other way. Nevertheless by manufacturing the parts 1, 2, 3 and 4 by ingot mold casting comparatively smooth external surfaces are produced even without subsequent machining, which abut without a joint against the machined end surfaces 17 and 19.

The parts 22 and 23 may when worn be exchanged in the simplest manner, the spiral spring 10 being removed, the parts 1 and 2 on the one hand and the parts 3 and 4 on the other hand being drawn apart and the strips 22 and 23 changed. Hereupon the parts 1 and 2 or 3 and 4, which do not require to be exchanged, are fitted in one another again, the spiral spring is put on and the dust pocket cap is connected again with the axle bearing housing. As is evident from a comparison of Figs. 9 and 10, in the event of the packing member, which is divided along planes at right angles to the axle and containing the axle journal axis, having a perfectly rigid construction, there is the danger of the gaps 33 being formed between the surface of the shaft 34 to be packed and the parts of the packing member 35, 36 or 37, 38. If however each part of the packing member be divided according to the invention in two sections 35', 35" or 35', 36" or 37', 37" or 38', 38" and if the resulting sections be connected at 39, or 40 by means of joints, as illustrated diagrammatically in Fig. 10, then there is the possibility of reliably avoiding the gaps 33 in spite of the rigid construction of the individual sections of the packing member.

Figs. 11 and 12 illustrate in the first place a constructional form of the joint-like connection. By way of example the parts 35' and 35" or 36' and 36", which are to be jointedly connected together at 39 (see Fig. 10) are provided with an annular recess 41, while the nipple-shaped projection 42, resulting from the formation of the recess, on the section 35' and 35" or 36' and 36" is somewhat reduced. A disc 43, the shape of which is evident from Fig. 11, lies in such a manner in the recess 41 that each pair of sections 35' and 35" or 36' and 36" are jointedly held together by means of the annular elevation 44 on each disc 43. Rivets 45 moreover connect each disc member 43 with the parts 35" or 36'.

The construction of the connecting joint according to Figs. 13 and 14 corresponds to that according to Figs. 11 and 12 with the difference that the disc 43 possesses a central pivot 46 on the front sides of which two pin-shaped projections 47 or 48 are provided. Moreover the sections, for example again 36' and 36", to be connected possess a circular recess 49 for the reception of the pins 47 and 48. After the packing member parts 35—38 which are symmetrical in pairs and which are suitably to be manufactured in permanent moulds have been provided at 41 and 49 with suitable recesses, they are taken apart in the sections 35', 35", 36', 36" and so on. Hereupon, for the purpose for example of jointedly connecting the parts 36' and 36" the disc 43 is so introduced between the two parts that the projections 47 and 48 lie with their longitudinal axis parallel to the end surfaces of the parts 36' and 36" bordering the joint of separation. After the annular elevation 44 has entered into the corresponding recess 41 in the sections, the disc 43 is turned through a right angle. The pin-shaped projections 47 and 48 now take up the position illustrated in Figs. 13 and 14 in which the two sections 36' and 36" are jointedly connected together completely by way of the parts 50 and 51 which are clamped on all sides.

Now in order also to close the separating joint between the parts 35', 35" and 37', 37" or 36', 36" and 38', 38" when the packing member parts are drawn apart, there are provided according to the present invention the following further arrangements. As is evident particularly from a comparison of Fig. 25 with the formerly proposed construction according to Fig. 17 (which is drawn somewhat differently but is essentially identical with Fig. 7) one of the packing member parts adjacent to the housing end surface, in this case the packing member part 38" being on the right side and the packing member part 38' being on the left side, possesses at the dividing joint 52, which according to the former proposals is already subdivided step-wise (compare Fig. 17) special lugs 54' or 54" projecting over the separating joint surfaces towards the free sides, which enter into corresponding recesses 56' and 56", so that the separating joint, as Fig. 26 makes particularly clear, remains closed even when the packing member parts are fully drawn apart.

In order to obtain the closure even in the case of the strip which consists of elastic materials and which covers the inner surface of the packing member 35 to 38 opposite the axle journal, the following measures are adopted in further carrying out the invention. The strip which is inserted with its annular projection 58 in the corresponding recess 59 of the packing member, possesses according to Figs. 27 and 28 a longitudinal joint, which divides it into two completely separate parts 60 and 61. The separating joints 62 and 63 which extend from the longitudinal joint towards the end surfaces 64 and 65 and divide it, slope moreover from the longitudinal joint outwards, so that in this manner the penetration of foreign bodies into the housing and also the escape of lubricant from the housing is prevented. The construction shown as an example in Figs. 29 and 30 corresponds completely with that in Figs. 27 and 28 with the single difference that the strip is a single part so that the longitudinal joint 66 extends only over a comparatively short portion. In both constructions however there exists a permanent closure of the separating joint no matter just what diameter the shaft to be packed possesses.

In the case of the construction shown by way of example in Figs. 31 and 32 the closure of the separating joint 67 is effected by letting a piece of copper sheet 69 into the lower part 68 of the strip, which copper sheet piece is permanently engaged in a corresponding recess 70 in the upper part 71 of the strip. This piece of copper sheet closes the free passage through the separating joint 67.

The strip 60, as is evident from Fig. 16, prevents the involuntary turning of the disc 43 by firmly abutting against the inner flattened part 43' of the disc 43. This safeguard is particularly essential in the case of the constructional example according to Figs. 13 and 14.

It is possible to make many modifications of the constructional examples within the scope of the invention without departing from the principles of the invention. Thus, it is possible for example instead of arranging a piece of copper sheet 69 for the purpose of closing the separating joints in the strip of flexible materials to arrange several such closure-walls.

I claim:—

1. Packing of a rotary shaft against the housing arranged upon it, more particularly oil and dust packing for axle bearings for rail vehicles, comprising the shaft, the bearing housing on the shaft, means for packing the shaft against the said housing, a packing chamber for receiving the packing, the said packing means consisting of a metallic packing device arranged between shaft and housing in the said packing chamber, the said packing device consisting of a plurality of metallic parts which are separated by partial planes at right angles to the axis and by dividing planes containing the axis, means for spreading apart the metallic parts in an axial direction and for drawing the said parts towards one another in a radial direction, the said packing device bearing with its metallic end faces directly against the metallic walls of the packing chamber, an annular recess in the inner surface of the metallic parts of the packing device turned toward the shaft, a flexible packing means arranged in the said recess and encased by the metallic packing parts after the manner of a casing, said packing means bearing directly against the shaft to be packed, the distance of the metallic parts from the shaft being greater than the change in thickness of the flexible packing means due to wear and compression.

2. Packing according to claim 1, said packing parts separated by planes at right angles to the axis and enclosing between them a conical recess, a single spiral spring closed per se and enclosing the packing parts on the entire periphery and arranged in the said conical recess, flexible packing means in the said packing device and consisting of a single packing strip.

3. Packing according to claim 1, said packing parts formed by dividing planes at right angles to the axis and enclosing between them an annular recess on the inner side turned toward the shaft, the flexible packing means in the recess including an annular packing strip of flexible material having projecting parts contained in the recess while a further part of the packing strip completely fills up the annular space between the rigid packing parts and the shaft.

4. Packing according to claim 1, said packing parts which are separated from one another by planes containing the axis engage with stepped notches, which are displaced relatively to one another for ensuring the guiding of the packing parts in the radial direction and for the symmetrical construction of the packing parts in pairs.

5. Packing according to claim 1, said packing parts being made of metal and said flexible packing parts consisting of leather strips.

6. Packing according to claim 1, said flexible packing parts having stepped or oblique dividing joints which slope toward the end surfaces of the packing.

7. Packing according to claim 1, the dividing joints of the flexible packing parts being displaced relatively to the dividing joints of the rigid packing parts.

8. Packing according to claim 1, stops or abutments arranged between the rigid packing parts and the packing chamber, and preventing a turning of the packing.

9. Packing of a rotary shaft against the housing arranged upon it, more particularly oil and dust packing for axle bearings for rail vehicles, comprising the shaft, the bearing housing on the shaft, means for packing the shaft against the said housing, a packing chamber on the housing for receiving the packing, the said packing means consisting of two metallic annular members which are separated from each other by a plane perpendicular to the axis of the axle journal, said annular members consisting of two segments each separated by a plane containing the axis of the axle journal, means for spreading apart the annular members in an axial direction and for drawing the segments towards one another in a radial direction, the said metal annular members with their outer end faces bearing directly against the metallic walls of the packing chamber, an annular recess in the inner surface of the annular member turned toward the shaft, flexible packing means arranged in the said recess and encased by the annular members after the manner of a casing, the said packing means bearing directly against the shaft to be packed, the distance of the metallic annular members from the shaft being greater than the change in thickness of the flexible packing means due to wear and compression.

10. Packing of a rotary shaft against the housing arranged upon it, more particularly oil and dust packing for axle bearings for rail vehicles, comprising the shaft, the bearing housing on the shaft, means for packing the shaft against said housing, a packing chamber on the housing for receiving the packing, said packing means consisting of two metallic annular members which are separated from each other by a plane perpendicular to the axis of the axle journal, said annular members consisting of segments separated by planes containing the axis of the axle journal, means for spreading apart the annular members in an axial direction and for drawing the segments towards one another in a radial direction, said metallic annular members having their outer end faces bearing directly against the metallic walls of the packing chamber, an annular recess in the inner surface of the annular members turned toward the shaft, flexible packing means arranged in the said recess and encased by the annular members after the manner of a casing, said packing means bearing directly against the shaft to be packed, the distance of the metallic annular members from the shaft being greater than the change in thickness of the flexible packing means due to wear and compression, joints in the said segments, the axis of said joints extending parallel to the axis of the shaft, said joints adapted to effect a displacement of the rigid sections of the segment connected by the joints and the joints of both annular members each having a common axis.

11. Packing according to claim 10, each part of said packing member having two sections provided with a joint situated in the middle of each part of the packing member.

12. Packing according to claim 10, said joints consisting of disks which receive in their central recesses nipple-like projections on the two sections of each packing member which are connected pivotally by means of a disk, the disk members being introduced in the sections of each part of the packing member.

13. Packing according to claim 1, said rigid parts of the packing member having lugs projecting over the separating joint surfaces towards the free sides and entering into corresponding recesses of the next part of the packing member, said lugs being adapted to close the separating joint toward the housing end surface for all diameters of the shaft which is packed by the parts of the packing member.

14. The combination with a shaft and with a housing which is arranged upon it, relatively to which housing the shaft executes spatial movements, of means for packing the shaft relatively to the housing, said means comprising an annular packing device arranged between said shaft and housing and consisting of a plurality of parts, separated by a plane at right angles to the axis of the shaft, and of a plurality of parts, separated by a plane containing said axis, each of the latter parts comprising two rigid sections each provided with a projection and a recess at one end, a disc revolubly connecting one end of one section to one end of the other section and having an annular recess in which said projections on the sections engage and having a circular projection engaging in said recesses in said sections and means connecting each disc to one of the sections and means for spreading apart the parts separated by the plane at right angles to the shaft axis and forcing towards one another the parts separated by the plane containing said axis.

15. The combination with a shaft and with a housing which is arranged upon it, relatively to which housing the shaft executes spatial movements, of means for packing the shaft relatively to the housing, said means comprising an annular packing device arranged between said shaft and housing and consisting of a plurality of parts, separated by a plane at right angles to the axis of the shaft, and of a plurality of parts, separated by a plane containing said axis, each of the latter parts comprising two rigid sections each provided with a projection and a recess at one end, a disc revolubly connecting one end of one section to one end of the other section and having an annular recess in which said projections on the sections engage and having a circular projection engaging in said recesses in said sections and a rivet connecting each disc to one of the sections and means for spreading apart the parts separated by the plane at right angles to the shaft axis and forcing towards one another the parts separated by the plane containing said axis.

16. The combination with a shaft and with a housing which is arranged upon it, relatively to which housing the shaft executes spatial movements, of means for packing the shaft relatively to the housing, said means comprising an annular packing device arranged between said shaft and housing and consisting of a plurality of parts, separated by a plane at right angles to the axis of the shaft, said parts having a conical annular recess divided by said plane, and of a plurality of parts, separated by a plane containing said axis, each of the latter parts comprising two metallic sections each provided with a projection and a recess at one end, a disc revolubly connecting one end of one section to one end of the other section and having an annular recess in which said projections on the sections engage and having a circular projection engaging in said recesses in said sections and means connecting each disc to one of the sections and means located in said conical annular recess for spreading apart the parts separated by the plane at right angles to the shaft axis and forcing towards one another the parts separated by the plane containing said axis.

17. The combination with a shaft and with a housing which is arranged upon it, relativey to which housing the shaft executes spatial movements, of means for packing the shaft relatively to the housing, said means comprising a metallic annular packing device arranged between said shaft and housing and having a recess in its internal annular surface and consisting of a plurality of parts, separated by a plane at right angles to the axis of the shaft, and of a plurality of parts, separated by a plane containing said axis, flexible material within said recess each of the latter parts comprising two metallic sections each provided with a projection and a recess at one end, a disc revolubly connecting one end of one section to one end of the other section and having an annular recess in which said projections on the sections engage and having a circular projection engaging in said recesses in said sections and means connecting each disc to one of the sections and means for spreading apart the parts separated by the plane at right angles to the shaft axis and forcing towards one another the parts separated by the plane containing said axis.

18. The combination with a shaft and with a housing which is arranged upon it, relatively to which housing the shaft executes spatial movements, of means for packing the shaft relatively to the housing, said means comprising an annular packing device arranged between said shaft and housing and consisting of a plurality of parts, separated by a plane at right angles to the axis of the shaft, and of a plurality of parts, separated by a plane containing said axis, each of the latter parts comprising two metallic sections each provided with a projection at one side of one end and with a recess at the other side of said end, a disc revolubly connecting one end of one section to one end of the other section and having an annular recess in which said projections on the sections engage and having a pivot provided with pin-like projections on its ends engaging in said recesses in said sections, and means for spreading apart the parts separated by the plane at right angles to the shaft axis and forcing towards one another the parts separated by the plane containing said axis.

19. The combination with a shaft and with a housing which is arranged upon it, relatively to which housing the shaft executes spatial movements, of means for packing the shaft relatively to the housing, said means comprising an annular packing device arranged between said shaft and housing and consisting of a plurality of parts, separated by a plane at right angles to the axis of the shaft, and of a plurality of parts, separated by a plane containing said axis, each of the latter parts comprising two rigid sections equal in length, a disc, having two peripheral flattened portions opposite one another, revolubly connecting one end of one section to one end of the other section and means for spreading apart the parts separated by the plane at right angles to the shaft axis and forcing towards one another the parts separated by the plane containing said axis.

20. The combination with a shaft and with a housing which is arranged upon it, relatively to which housing the shaft executes spatial movements, of means for packing the shaft relatively to the housing, said means comprising an annular packing device arranged between said shaft and housing and consisting of a plurality of parts, separated by a plane at right angles to the axis of the shaft, and of a plurality of parts, separated by a plane containing said axis, each of the latter parts comprising two metallic sections each provided with an integral projection and a recess at one end, a disc, having two peripheral flattened portions opposite one another, revolubly connecting one end of one section to one end of the other section and having an annular recess in which said projections on the sections engage and having a circular projection engaging in said recesses in said sections and means connecting each disc to one of the sections and means for spreading apart the parts separated by the plane at right angles to the shaft axis and forcing towards one another the parts separated by the plane containing said axis.

21. The combination with a shaft and with a housing which is arranged upon it, relatively to which housing the shaft executes spatial movements, of means for packing the shaft relatively to the housing, said means comprising a metallic annular packing device arranged between said shaft and housing and having an annular recess in its internal annular surface and consisting of a plurality of parts, separated by a plane at right angles to the axis of the shaft, and of a plurality of parts, separated by a plane containing said axis, a transversely split annular strip of flexible material within said recess a partition interconnecting the split ends of said annular strip and means for spreading apart the parts separated by the plane at right angles to the shaft axis and forcing towards one another the parts separated by the plane containing said axis.

22. The combination with a shaft and with a housing which is arranged with it, relatively to which housing the shaft executes spatial movements, of means for packing the shaft relatively to the housing, said means comprising a metallic annular packing device arranged between said shaft and housing and having an annular recess in its internal annular surface and consisting of a plurality of parts separated by a plane at right angles to the axis of the shaft, and of a plurality of parts, separated by a plane containing said axis, a transversely split annular strip of flexible material within said recess a copper sheet partition interconnecting the split ends of said annular strip and means for spreading apart the parts separated by the plane at right angles to the shaft axis and forcing towards one another the parts separated by the plane containing said axis.

23. The combination with a shaft and with a housing which is arranged upon it, relatively to which housing the shaft executes spatial movements, of means for packing the shaft relatively to the housing, said means comprising a metallic annular packing device arranged between said shaft and housing and having an annular recess in its internal annular surface and consisting of a plurality of parts, separated by a plane at right angles to the axis of the shaft, and of a plurality of parts, separated by a plane containing said axis, a transversely split annular strip of flexible material within said recess, one of the ends of which strip is provided with a recess, a partition engaging at one end in said recess, means firmly connecting the other end of said partition with the other end of the strip and means for spreading apart the parts separated by the plane at right angles to the shaft axis and forcing towards one another the parts separated by the plane containing said axis.

24. The combination with a shaft and with a housing which is arranged upon it, relatively to which housing the shaft executes spatial movements, of means for packing the shaft relatively to the housing, said means comprising a metallic annular packing device arranged between said shaft and housing and having an annular recess in its internal annular surface and consisting of a plurality of parts, separated by a plane at right angles to the axis of the shaft, and of a plurality of parts, separated by a plane containing said axis, a transversely split annular strip of flexible material within said recess, one of the ends of which strip is provided with a recess, a copper sheet partition engaging at one end in said recess, means firmly connecting the other end of said partition with the other end of the strip and means for spreading apart the parts separated by the plane at right angles to the shaft axis and forcing towards one another the parts separated by the plane containing said axis.

VICTOR ALEXANDER BARY